US006937279B1

(12) United States Patent
Kim et al.

(10) Patent No.: US 6,937,279 B1
(45) Date of Patent: Aug. 30, 2005

(54) APPARATUS FOR CONVERTING ANALOG IMAGE DATA INTO DIGITAL IMAGE DATA IN CMOS IMAGE SENSOR

(75) Inventors: Hyun-Eun Kim, Ichon-shi (KR);
Suk-Joong Lee, Ichon-shi (KR);
Gyu-Tae Hwang, Ichon-shi (KR);
Oh-Bong Kwon, Ichon-shi (KR)

(73) Assignee: Hynix Semiconductor Inc., Ichon-shi (KR)

( * ) Notice: Subject to any disclaimer, the term of this patent is extended or adjusted under 35 U.S.C. 154(b) by 0 days.

(21) Appl. No.: 09/469,317

(22) Filed: Dec. 22, 1999

(30) Foreign Application Priority Data

Dec. 22, 1998  (KR) ............................... 1998-57237

(51) Int. Cl.[7] .......................... H04N 3/14; H04N 5/335
(52) U.S. Cl. ...................... 348/308; 348/302; 341/169
(58) Field of Search ............................... 341/155, 161, 341/169, 170; 348/208, 294, 222.1, 222, 348/302; 382/271

(56) References Cited

U.S. PATENT DOCUMENTS 3,971,065 A * 7/1976 Bayer ......................... 348/276
5,874,994 A * 2/1999 Xie et al. .................... 348/349
5,982,318 A * 11/1999 Yiannoulos ................. 341/155
6,137,432 A * 10/2000 Xiao .......................... 341/169

FOREIGN PATENT DOCUMENTS

GB       2 325 585       11/1998    .......... H04N 5/217

* cited by examiner

Primary Examiner—Tuan Ho
Assistant Examiner—Yogesh Aggarwal
(74) Attorney, Agent, or Firm—Mayer, Brown, Rowe & Maw LLP

(57) ABSTRACT

Disclosed is an apparatus for converting an analog image data into a digital image data in a CMOS image sensor including a pixel array having M (row line)×N (column line) color pixels, wherein the color pixels include a first color pixel for sensing a first color, a second color pixel for sensing a second color and a third pixel for sensing a third color. The apparatus includes an analog reference voltage generating unit for generating different analog reference voltages according to the analog image data of the color pixels, wherein the different analog reference voltage has different value and different decline rate, a selecting unit, in response to a select control signal, for selecting one of the corresponding analog reference voltages according to the color pixels, and a comparing unit for comparing the analog reference voltage and the analog image data to generate the digital image data corresponding to the color pixels, whereby a conversion operation of the analog image data into the digital image data is differently carried out according to the color characteristic.

13 Claims, 4 Drawing Sheets

APPARATUS FOR CONVERTING ANALOG IMAGE DATA INTO DIGITAL IMAGE DATA IN CMOS IMAGE SENSOR

FIELD OF THE INVENTION

The present invention relates to a CMOS image sensor; and, more particularly, to an apparatus for converting an analog digital image data into a digital image data according to color characteristics.

DESCRIPTION OF THE PRIOR ART

Generally, an image sensor is an apparatus to capture images using light sensing semiconductor materials. The image sensor includes a pixel array, which contains a plurality of image sensing elements, e.g., photodiode and receives light from an object to generate an electric image signal.

The image sensor includes a control and system interface unit for controlling the image sensor by controlling control signals, a pixel array and an analog-to-digital converter for converting an analog image data from the pixel array into a digital image data. Also, the analog-to-digital converter includes a ramp voltage generator for generating a reference voltage with a predetermined slope, a comparator for comparing the reference voltage with the analog image data to generate a digital image data, and a double buffer for storing the digital image data.

FIG. 2 is a circuit diagram illustrating a CMOS image sensor core. The core circuit includes a unit pixel 200, a comparator 320 and a unit latch circuit 400, and FIG. 3 is a plot illustrating an operation of a comparator and a double buffer shown in FIG. 2. That operation of the image sensor core is disclosed in a copending commonly owned application, U.S. Ser. No. 09/258,448, entitled "CMOS IMAGE SENSOR WITH TESTING CIRCUIT FOR VERIFYING OPERATION THEREOF" filed on Feb. 26, 1999. Therefore, a detailed description is omitted.

Using the conventional method for converting the analog image data into the digital image data, however, the analog-to-digital conversion operation is carried out only by comparing the reference voltage with the analog image data without consideration of color characteristics.

SUMMARY OF THE INVENTION

It is, therefore, an object of the present invention to provide an apparatus for converting an analog digital image data into a digital image data in a CMOS image sensor according to color characteristics.

In accordance with an embodiment of the present invention, there is provided an apparatus for converting an analog image data into a digital image data in a CMOS image sensor including a pixel array having M (row line)×N (column line) color pixels, wherein the color pixels include a first color pixel for sensing a first color, a second color pixel for sensing a second color and a third pixel for sensing a third color, the apparatus comprising: a) an analog reference voltage generating means for generating different analog reference voltages according to the color pixels, wherein the different analog reference voltage has different value and different decline rate; b) a selecting means, in response to a select control signal, for selecting one of the corresponding analog reference voltages according to the color pixels; and c) a comparing means for comparing the analog reference voltage and the analog image data to generate the digital image data corresponding to the color pixels, whereby a conversion operation of the analog image data into the digital image data is differently carried out according to the color characteristic.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Figure 1:
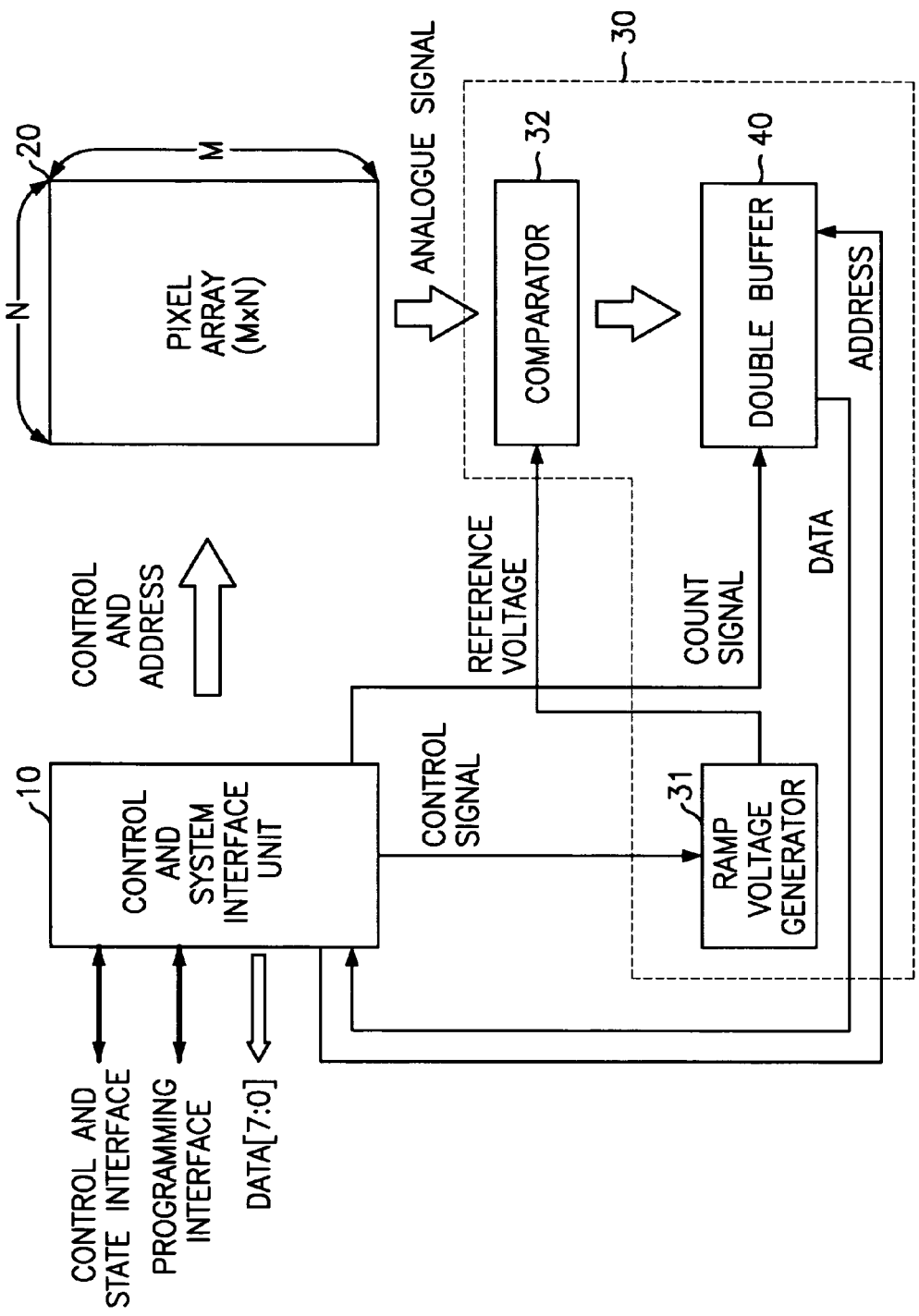
FIG. 1 is a block diagram illustrating a CMOS image sensor.
Figure 2:
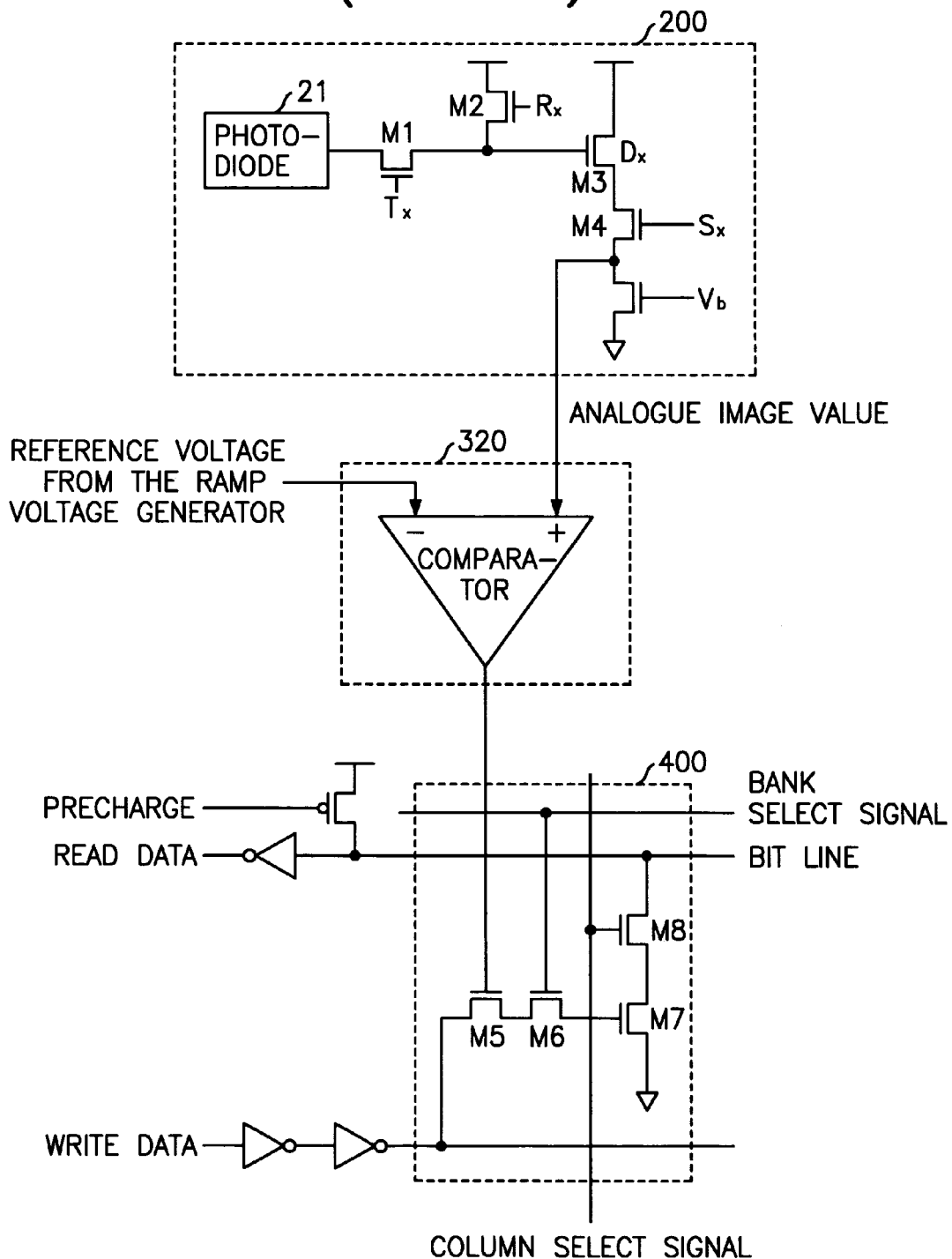
FIG. 2 is a circuit diagram illustrating a CMOS image sensor core.
Figure 3:
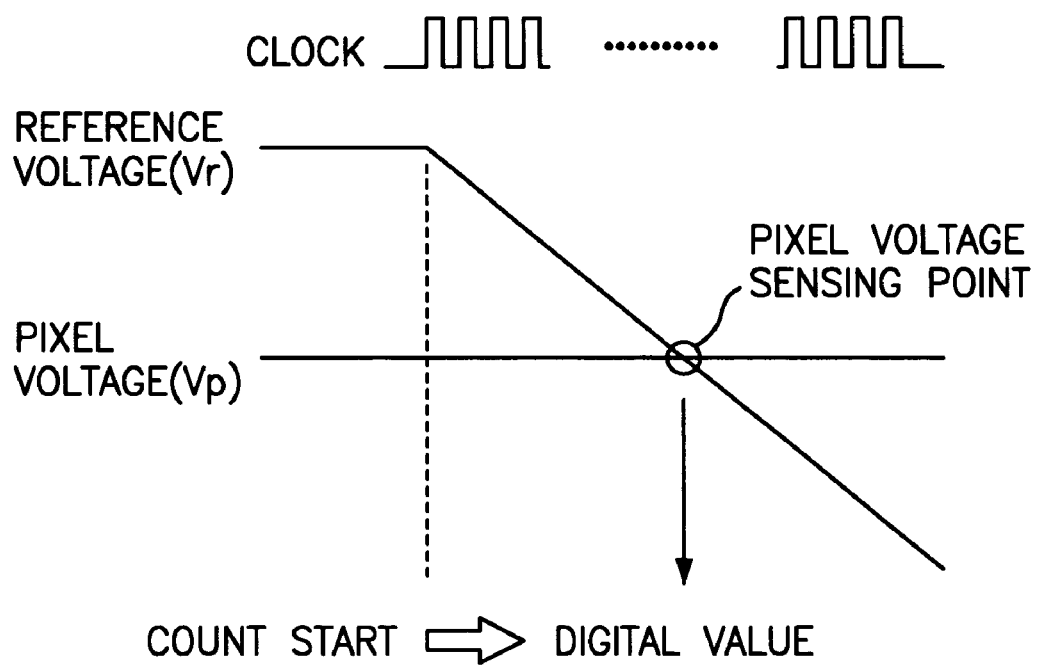
FIG. 3 is a plot diagram illustrating an operation of a comparator and a double buffer.

FIG. 1 is a block diagram illustrating a CMOS image sensor. The CMOS image sensor includes a control and system interface unit 10, a pixel array 20 having a plurality of image sensing elements, and an analog-to-digital converter 30. The analog-to-digital converter 30 also a ramp voltage generator 31 for generating a reference voltage, a comparator 32 for comparing the reference voltage with a analog image data from the pixel array 20 to generator a digital image data, and a double buffer 40 for storing the digital image data.

Figure 4:
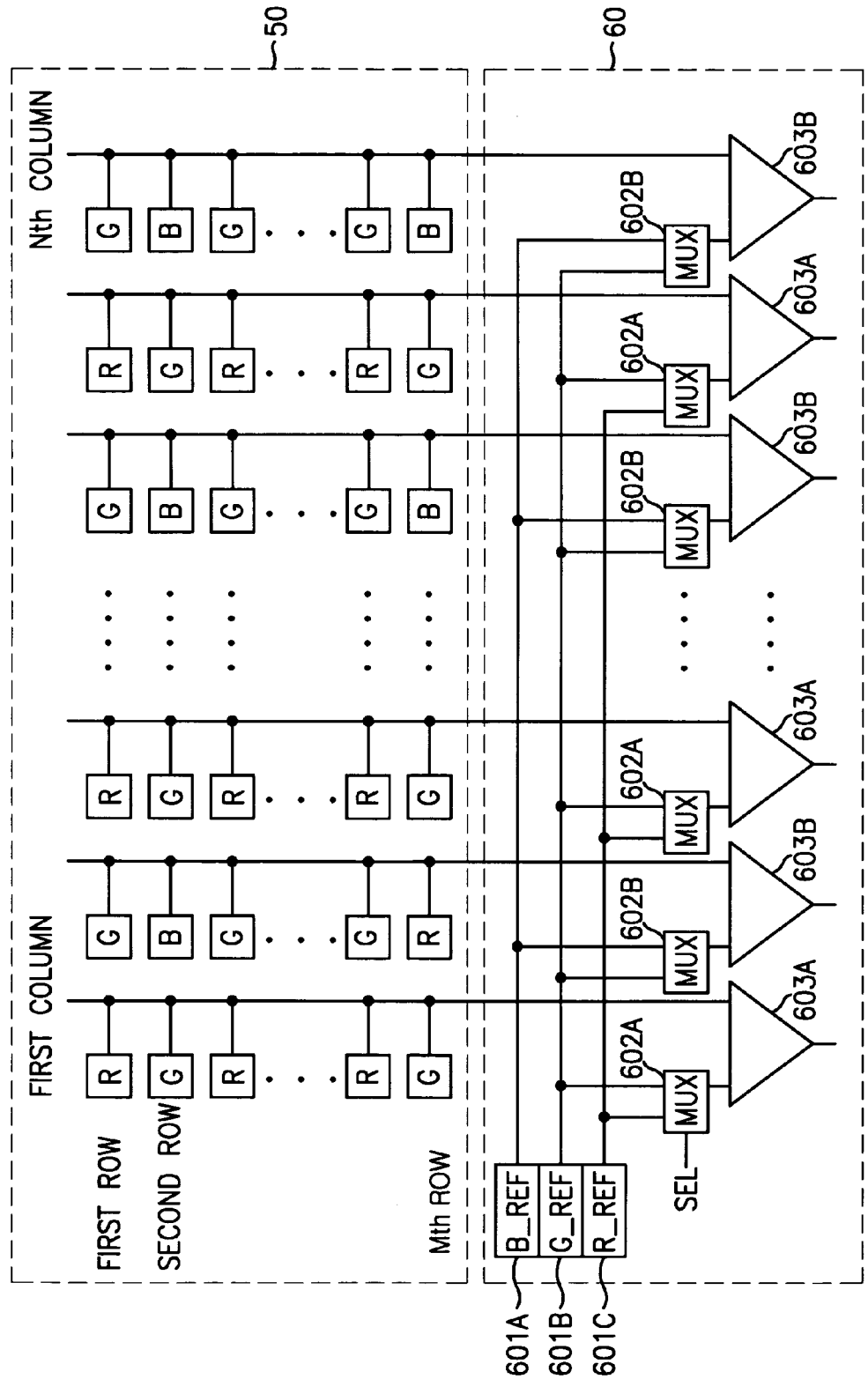
FIG. 4 is a block diagram illustrating a CMOS image sensor according to the present invention.

In this present invention, the analog-to-digital conversion is modified as shown in FIG. 4.

FIG. 4 is a block diagram illustrating a CMOS image sensor according to the present invention. Referring to FIG. 4, a CMOS image sensor includes a pixel array 50 of Bayer pattern type includes M×N color pixels, arranged in a matrix, and an analog-to-digital conversion unit 60 for converting an analog image data into a digital image data.

The pixel array 50 of Bayer pattern type is incorporated with repetitive arrangements of a RGRG type and a GBGB type in odd row lines and even row lines line, respectively. Here, "R" represents a red color pixel for sensing only red color, "G" a green color pixel for sensing only green color and "B" a blue color pixel for sensing blue color. Each analog voltage signal corresponding to respective color pixels has a different characteristic. By employing the different color characteristic, the analog-to-digital converter generates a different reference voltage at the analog-to-digital conversion to convert an analog image data into a digital image data.

The analog-to-digital conversion unit 60 includes analog reference voltage generating units 601A, 601B and 601C, N multiplexers 602A and 602B, and N comparators 603A and 603B. Here, the analog reference voltage generating units includes a first reference voltage generator 601A for the blue color pixel, a second reference voltage generator 601B for the green color pixel, and a third reference voltage generator 601C for the red color pixel, each of which generates respective analog reference voltage with a different decline rate. The multiplexers 602A and 602B selectively output one of the analog reference voltages in response to a select control signal SEL and the comparators 603A and 603B compare the selected reference voltage from the multiplexers 602A and 602B with the analog image data from the pixel array 50. At this point, since red pixels and green pixels are arranged on odd column lines by turns, the multiplexers 602A arranged on the odd column lines output one of the analog reference voltage of the second and third reference voltage generators 602B and 601C according to the color pixels. On the contrary, since green pixels and blue pixels are arranged on even column lines by turns, the multiplexers 602B arranged on even lines output one of the analog reference voltages of the first and second reference voltage generators 601A and 601B according to the color pixels.

First, the conversion operation at the first row line will be described.

Since the red pixels and the green pixels are arranged on the odd column lines and the even column lines, respectively, the multiplexers 602A arranged on the odd column lines selectively output the analog reference voltage of the third reference generator 601C in response to the select control signal SEL to the comparators 603A arranged on the odd column line. Also, the multiplexers 602B arranged on the even column lines selectively output the reference voltage of the second reference generator 601B in response to the select control signal SEL to the comparator 603B arranged on the even column lines. Then, the comparators 603A arranged on the odd column lines compare the analog image data from the red pixels with the output of the multiplexers 602A. In similar manner, the comparators 603B arranged on the even column lines compare the analog image data from the green pixels with the output of the multiplexers 602B. Then, the following procedure is the same as the prior art.

Next, a conversion operation at the second row line will be described.

Since the green pixels and the blue pixels are arranged on the odd column lines and the even column lines, respectively, the multiplexers 602A arranged on the odd column lines selectively output the analog reference voltage of the second reference generator 601C in response to the select control signal SEL to the comparators 603A arranged on the odd column line. Also, the multiplexers 602B arranged on the even column lines selectively output the reference voltage of the first reference generator 601B in response to the select control signal SEL to the comparator 603B arranged on the even column lines. Then, the comparators 603A arranged on the odd column lines compare the analog image data from the green pixels with the output of the multiplexers 602A. In similar manner, the comparators 603B arranged on the even column lines compare the analog image data from the blue pixels with the output of the multiplexers 602B. Then, the following procedure is the same as the prior art.

By carrying out the above-mentioned operation repeatedly, analog image data of all of the color pixels can be converted into corresponding digital image data.

Since different analog reference voltages are generated according to the image data characteristic, the red, green and blue color characteristics can be precisely controlled.

While the present invention has been described with respect to certain preferred embodiments only, other modifications and variation may be made without departing from the spirit and scope of the present invention as set forth in the following claims.

What is claimed is:

1. An apparatus for converting an analog image data into a digital image data according to at least one color characteristic and at least one image data characteristic in a CMOS image sensor including a pixel array having M (row line)×N (column line) color pixels, wherein the color pixels include a first color pixel for sensing a first color, a second color pixel for sensing a second color and a third color pixel for sensing a third color, the apparatus comprising:

N number of a column pixel arrays, each having two different color pixels selected among the first to third color pixels for outputting two analog image data in response to an inputted image;

an analog reference voltage generator having first to third reference voltage generators, each for generating first to third analog reference voltages corresponding to the first to third color pixels, wherein each one of the first to third analog reference voltages is generated as a different value with a different decline rate from the other analog reference voltages according to the at least one image data characteristic;

N number of selectors, each for selecting one of two inputted analog reference voltages in response to a select control signal which are inputted based on the two color pixels in the column pixel array, wherein the two inputted analog reference voltages respectively correspond with two of the first to third color pixels included in the column pixel array; and N number of comparators, each for comparing a selected analog reference voltage outputted from each selector with one of the two analog image data outputted from each column pixel array to generate the digital image data corresponding to the color pixels, whereby a conversion operation of the analog image data into the digital image data is carried out differently according to the color characteristic.

2. The apparatus as recited in claim 1, wherein the analog reference voltage generator includes:

the first reference voltage generator for generating the first reference voltage with respect to the first color pixel;

the second reference voltage generator for generating the second reference voltage with respect to the second color pixel; and the third reference voltage generator for generating the third reference voltage with respect to the third color pixel.

3. The apparatus as recited in claim 2, wherein the color pixels contained in the pixel array are arranged as a form of a Bayer pattern, the Bayer pattern including:

the first color pixels and the second color pixels repeatedly arranged on odd row lines of the pixel array in this order; and the second color pixels and the third color pixels repeatedly arranged on even row lines of the pixel array in this order.

4. The apparatus as recited in claim 3, wherein the selectors include:

a first selector, arranged on the odd column lines, for selecting one of the first reference voltage and the second reference voltage in response to the select control signal according to the color pixels; and a second selector, arranged on the even column lines, for selecting one of the second reference voltage and third reference voltage in response to the select control signal according to the color pixels.

5. The apparatus as recited in claim 4, wherein the first color pixel is a red color pixel, the second color pixel is a green color pixel and the third color pixel is a blue color pixel.

6. The apparatus as recited in claim 4, wherein the selector is a multiplexer.

7. A CMOS image sensor for generating a digital image data corresponding to an inputted image based at least one color characteristic and at least one image data characteristic, comprising:

a pixel array including M (row line)×N (column line) color pixels activated in a row-by-row basis, wherein the M×N color pixels have N number of column pixel arrays, each having two different color pixels selected among first to third color pixels for outputting an analog image data corresponding to an activated color pixel;

an analog reference voltage generator for generating first to third analog reference voltages corresponding to the first to third color pixels, wherein each of the first to third analog reference voltages has a different value with a different decline rate according to the image data characteristic;

N number of selectors, each for selecting one of two of the first to third analog reference voltages in response to a select control signal; and N number of comparators, each for comparing a selected analog reference voltage outputted from each selector with the analog image data to generate the digital image data corresponding to the activated color pixel, whereby a conversion operation of the analog image data into the digital image data is carried out differently based on the color characteristic.

8. The CMOS image sensor as recited in claim 7, wherein two of the first to third analog reference voltages inputted to each selector respectively correspond to two of the first to third color pixels included in the column pixel array.

9. The CMOS image sensor as recited in claim 8, wherein the select control signal is inputted based on the two color pixels included in each column pixel array.

10. The CMOS image sensor as recited in claim 9, wherein the analog reference voltage generator includes:

a first reference voltage generator for generating the first reference voltage with respect to the first color pixel according to the image data characteristic;

a second reference voltage generator for generating the second reference voltage with respect to the second color pixel according to the image data characteristic; and a third reference voltage generator for generating the third reference voltage with respect to the third color pixel according to the image data characteristic.

11. The CMOS image sensor as recited in claim 10, wherein the M×N color pixels contained in the pixel array are arranged as a form of a Bayer pattern, the Bayer pattern including:

the first color pixels and the second color pixels repeatedly arranged on odd row lines of the pixel array in this order; and the second color pixels and the third color pixels repeatedly arranged on even row lines of the pixel array in this order.

12. The CMOS image sensor as recited in claim 11, wherein the first color pixel is a red color pixel, the second color pixel is a green color pixel and the third color pixel is a blue color pixel.

13. The CMOS image sensor as recited in claim 12, wherein the selector is a multiplexer.

* * * * *